(12) United States Patent
Chen et al.

(10) Patent No.: US 11,753,242 B2
(45) Date of Patent: Sep. 12, 2023

(54) LOADING EQUIPMENT AND CONVEYING SYSTEM FOR TANK TRACK MOVING SUPPORT

(71) Applicants: Qingdao University of Technology, Qingdao (CN); Qingdao Cabos Intelligent Manufacturing Co., Ltd, Qingdao (CN); IK Gujral Punjab Technical University, Shubham Sharma, Jalandhar (IN)

(72) Inventors: Minkai Chen, Qingdao (CN); Changhe Li, Qingdao (CN); Aiguo Qin, Qingdao (CN); Shubham Sharma, Jalandhar (IN); Hanqi Fan, Qingdao (CN); Zongming Zhou, Qingdao (CN); Min Li, Qingdao (CN); Junting Li, Qingdao (CN); Tao Jiang, Qingdao (CN); Xufeng Zhao, Qingdao (CN)

(73) Assignees: Qingdao University of Technology, Qingdao (CN); Qingdao Cabos Intelligent Manufacturing Co., Ltd, Qingdao (CN); IK Gujral Punjab Technical University, Shubham Sharma, Jalandhar (IN)

( * ) Notice: Subject to any disclaimer, the term of this patent is extended or adjusted under 35 U.S.C. 154(b) by 18 days.

(21) Appl. No.: 17/568,429

(22) Filed: Jan. 4, 2022

(65) Prior Publication Data
US 2023/0143983 A1 May 11, 2023

(30) Foreign Application Priority Data

Nov. 10, 2021 (CN) .......................... 202111326732.6

(51) Int. Cl.
*B65G 1/133* (2006.01)
*B25J 5/02* (2006.01)
(Continued)

(52) U.S. Cl.
CPC ................ *B65G 1/133* (2013.01); *B25J 5/02* (2013.01); *B65G 17/12* (2013.01); *B65G 61/00* (2013.01); *B66C 17/26* (2013.01); *B66F 9/142* (2013.01)

(58) Field of Classification Search
CPC ................................. B65G 1/133; B65G 17/12
See application file for complete search history.

(56) References Cited

U.S. PATENT DOCUMENTS 4,379,602 A * 4/1983 Iemura .................. B65G 1/133
198/799
5,161,698 A * 11/1992 Hatouchi ............... B65G 1/133
211/1.56
(Continued)

FOREIGN PATENT DOCUMENTS

| CN | 202192464 U | 4/2012 |
| CN | 212578357 U | 2/2021 |
| CN | 214134501 U | 9/2021 |

*Primary Examiner* — Jonathan Snelting
(74) *Attorney, Agent, or Firm* — True Shepherd LLC; Andrew C. Cheng

(57) ABSTRACT

An loading equipment and a conveying system for tank track moving supports are provided, the loading equipment includes an circular conveyor line and a loading device; the circular conveyor line includes a support frame, a baseplate is connected with the support frame, an circular guide rail is connected with the baseplate, trays are connected above the circular guide rail, fixture assemblies are connected with the trays, an circular driving part is connected with the trays; tracking cars are fixedly connected with the trays and slidably connected with the circular guide rail; the circular driving part is fixedly connected with the tracking cars. Seamless involvement of moving support from the blank transmission to the processing output process is achieved, the processing efficiency is improved, and the position of the moving support in the transportation process is definite.

9 Claims, 9 Drawing Sheets

(51) Int. Cl.
B65G 17/12 (2006.01)
B65G 61/00 (2006.01)
B66C 17/26 (2006.01)
B66F 9/14 (2006.01)

(56) References Cited

U.S. PATENT DOCUMENTS

| | | | | |
|---|---|---|---|---|
| 5,449,262 A | * | 9/1995 | Anderson | B65G 1/133 414/280 |
| 6,036,427 A | * | 3/2000 | Kita | B61B 13/00 104/119 |
| 2005/0008464 A1 | * | 1/2005 | Emmerling | B65G 1/133 414/331.03 |

* cited by examiner

LOADING EQUIPMENT AND CONVEYING SYSTEM FOR TANK TRACK MOVING SUPPORT

TECHNICAL FIELD

The invention relates to the technical field of processing of tank track moving supports, and in particular to a loading equipment and a loading and conveying system of tank track moving supports.

BACKGROUND

As the China's machinery industry develops rapidly, the manufacturing and research and development of all kinds of large-scale machinery have made rapid progress. Track has the advantages of climbing steep slopes, passing through trenches, wading through deep water, conquering overhanging walls, crossing swamps and fields, and being overwhelming. It is widely used in various tanks, construction machinery and agricultural machinery. Due to the different application and modes of different machines, there are many kinds and sizes of tank tracks. The moving support is an important component of the tank track drive device, has various types, changeable structures and different sizes, and makes the processing process more complicated.

Moreover, with the improvement of science and technology level, automation and intelligence are widely applied in industrial production, and the products manufactured by factories are increasingly diverse. In industrial production, when the production machine processes raw materials, it is necessary to place raw materials in the designated position of production and processing, which is called feeding. Manual feeding is the original feeding way. Although it is adapted to the complex and changeable feeding environment, the manual feeding efficiency is low, which affects the production efficiency of the machine, and it needs manual uninterrupted duty and large labor intensity. With the development of science and technology, automatic loading equipment are produced.

As the starting point of the machining process of the moving support, the loading system of the moving support is essential. For the automatic production line, fast and efficient loading devices are even more indispensable to reduce the labor of workers and improve production efficiency. Moreover, in the process of enterprise development, it is a must to save costs and improve efficiency, so the need for the loading system of the moving support arises.

In the prior art, Chinese patent application No. CN202020714500.2 (corresponding to Chinese patent publication No. CN212923318U) discloses an intelligent mechanical automatic loading equipment, which includes a base, the upper surface of the base is fixedly connected with a bracket, the right end of the bracket is fixedly connected with a material rack on the upper surface of the base, the left end of the bracket is fixedly connected with a conveyor belt on the upper surface of the base, the bracket is equipped with a power device and an adsorption device for sucking air by a vacuum machine, the material is placed in the material rack groove, and then the material is transported by the power device to conveyor belt after vacuum adsorption. This device has the advantages of accurate feeding position and reduced manpower. However, this device cannot adsorb curved surfaces and complex surfaces through vacuum adsorption, which has great limitations, and it can only load materials placed directly above the material rack. If the material rack is divided into multiple layers, this device cannot perform the function of loading. Chinese patent application No. CN201310489461.5 (corresponding to Chinese publication No. CN103496567A) discloses an automatic loading equipment. The device includes a vibrating loading device, a material conveying device, an automatic material taking device and a circulating loading device. The automatic loading equipment randomly vibrates the materials by the way of mechanical vibration, vibrates the materials to a certain position for detection by the image sensing device, takes the materials with the required posture from the material conveying device, and circularly vibrates the materials with the unqualified posture for loading again. Therefore, the automatic loading equipment has strong versatility, can adapt to a variety of materials with different shapes, and meets requirements of the various products and different specifications at present. However, due to its vibration, this device cannot guarantee the accurate attitude in machining, and its continuous feeding function is poor, so it cannot meet the requirements of continuous loading. Chinese patent application No. CN201911246021.0 (corresponding to Chinese publication No. CN110980253A) discloses an industrial automatic loading equipment, which includes a device body, a telescopic cylinder, a motor and a switch, the telescopic cylinder is connected with a fixed cylinder, the outer surface of the fixed cylinder is fixed with a pulley, the pulley is connected with a belt, and the inside of the fixed cylinder is connected with a threaded rod through threads, and the fixed plate can be replaced under the action of the pulley and the threaded rod, and different fixed plates can clamp different workpieces, and the feeding can be temporarily adjusted by pressing the fixed cylinder. The device solves the problem that the shape of the fixing structure of the loading device cannot be adjusted according to materials, so that the fixing structure can fix the materials with different shapes, and the materials with different heights can be fixed by adjusting the fixed cylinder, thus solving the problem that the existing loading device cannot temporarily adjust the feeding speed of the materials when in use, avoiding the work of workers to manually block the materials from advancing, and reducing the potential safety hazard of the loading device when in use. However, this device needs manual switch adjustment, which has some disadvantages, such as limited automation, limited shape of the fixed plate, inability to compress complex parts, and certain limitation on the placement of materials when fixed and compressed by the fixed plate.

To sum up, there are few loading devices for tank track moving support, and manual labor is needed in processing, which leads to problems such as low working efficiency and heavy workloads. However, the existing loading device has some problems that need to be overcome and are not applicable in factories. For example, due to insufficient adaptability, it is impossible to feed the moving supports with complex shapes and different sizes; it is impossible to ensure the accurate positioning of the workpiece during the feeding process, resulting in the problems of long clamping time and inaccurate precision during processing; inaccurate grasping of materials causes damage to the moving support; good efficiency and stability in the feeding process cannot be guaranteed. Track is widely used in all kinds of machinery, and moving support thereof is complex and changeable, with different sizes, which causes great difficulties in feeding. Today, with the rapid development of automation, the automatic production line of moving support has become a major demand. Therefore, it is an urgent need to design an automatic loading equipment for tank track moving support.

SUMMARY

The objective of the invention is to provide a loading equipment and a loading and conveying system for the tank track moving support to solve the above problems. Based on the principle of zero-point positioning, the tooling plates, the fixture and the moving support are transported to the workbench by the power-assisted crane to assemble the follow fixture; the follow fixture is conveyed to different working positions in the machining through the circular conveyor line and the ground rail manipulator; the automatic assembly of the follow fixture is realized through the cooperation of the tooling rail and the screwing manipulator; the gantry manipulator realizes the transportation from the tooling rail to the circular conveyor line; the moving support is fully utilized from blank transmission to processing output, which improves the processing efficiency, and the position of the moving support is determined and the accuracy is good during transportation.

In order to achieve the above objective, the invention provides the following scheme: a loading equipment for a tank track moving support includes an circular conveyor line, one side of the circular conveyor line is provided with a loading device; the circular conveyor line includes a support frame, the top of the support frame is fixedly connected with a baseplate, the top surface of the baseplate is fixedly connected with an circular guide rail, a plurality of trays are slidably connected above the circular guide rail, the tops of the trays is detachably connected with fixture assemblies respectively, and the bottoms of the trays is fixedly connected with a circular driving part for moving the trays;

the bottoms of the trays are fixedly connected with tracking cars respectively, the tracking cars are slidably connected with the circular guide rail, and the circular driving part is fixedly connected with the tracking cars.

Preferably, the circular driving part includes gears rotatably connected to the four corners of the baseplate, and a chain is sleeved outside the four gears, and the chain is fixedly connected with each tracking car, one of the four gears is coupled with a shaft, the shaft is coupled with a gear motor, the bottom surface of the baseplate is fixedly connected with a mounting bracket, the gear motor is fixedly connected with the mounting bracket, the top of each of the trays is fixedly connected with bland rivet positioning grooves, and a corresponding one of the fixture assemblies is detachably connected with the bland rivet positioning grooves.

Preferably, the fixture assembly includes tooling plates, the top of the tooling plates is detachably connected with a fixture body; the bottom of the tooling plates is fixedly connected with blind rivet mounting grooves; the blind rivet mounting grooves are detachably connected with blind rivets respectively; and the blind rivets are detachably connected with the blind rivet positioning grooves respectively.

Preferably, the loading device includes a power-assisted device located at one side of the support frame, which includes a power-assisted bracket, the top surface of the power-assisted bracket is fixedly connected with two first beams and two second beams, the two first beams are perpendicular to the two second beams, the bottom of the second beams is fixedly connected with first connecting pieces, the bottoms of the first connecting pieces are fixedly connected with X-axis guide rails (also referred to as transversal guide rails), and the bottoms of the X-axis guide rails are fixedly connected with second connecting pieces; the bottoms of the second connecting pieces are fixedly connected with a Y-axis guide rail (also referred to as longitudinal guide rail), and the bottom of the Y-axis guide rail is slidably connected with a power-assisted crane and a vertical sliding column, the power-assisted crane is fixedly connected to one side of the top of the vertical sliding column, and the vertical sliding column is slidably connected to a forklift, and the top of the forklift is fixedly connected with a steel wire rope of the power-assisted crane.

Preferably, the loading device includes an automatic loading device located at one side of the support frame, and the automatic loading device includes a handling mechanism, the side of the handling mechanism facing away from the support frame is provided with a screw mounting mechanism, and the side of the screw mounting mechanism facing away from the support frame is provided with a fixture assembling mechanism;

the screw mounting mechanism includes a mechanical arm, and the movable end of the mechanical arm is fixedly connected with an inner hexagon screwing device and an outer hexagon screwing device.

Preferably, the fixture assembling mechanism includes a rail, the rail is slidably connected with one of the trays, the rail is rotatably connected with a screw assembly, the slider of the screw assembly is fixedly connected with a bottom surface of the one of the trays, a material taking bracket is arranged across the rail, two upright columns of the material taking bracket are respectively provided with screw slide assemblies, and the lead screw of one of the screw slide assemblies is threadedly connected with an external mechanical gripper; the lead screw of the other of the screw slide assemblies is threadedly connected with an internal mechanical gripper, ends on both two sides of the rail is provided with storage workbenches, a feeding device is connected between the two upright columns of the material taking bracket through a rack and pinion mechanism, the external mechanical gripper, the internal mechanical gripper and the storage workbenches are located at the same side, the storage workbenches are located at one side close to the support frame, and an industrial camera is fixedly connected below any one of the external mechanical gripper and the internal mechanical gripper.

Preferably, the handling mechanism includes a loading bracket, the top of which is fixedly connected with a connecting block, the lower end of which is fixedly connected with a transfer bracket, and both two ends of the transfer bracket are rotatably connected with a ball screw, and both two ends of the transfer bracket are fixedly connected with a ball screw guide rail, which is slidably connected with a slider, which is screwed with the ball screw, and the ball screw is connected with the ball screw motor, and both two sides of the transfer bracket are fixedly connected with a connecting rail, which is fixedly connected with a transfer mechanical gripper and the bottom of the slider is fixedly connected with transfer mechanical gripper.

Preferably, the feeding device includes a mounting plate, two ends of which are rotatably connected with a gear set; the gear set is connected with the output shaft of a lifting motor; the lifting motor is fixedly connected to the mounting plate; one side of the mounting plate is fixedly connected with a guide rail mounting plate; the guide rail mounting plate is fixedly connected with a convex rail, and the convex rail is slidably connected with two sliding blocks; the two sliding blocks are respectively fixedly connected with insertion racks; the insertion rack is in an L-shaped structure; the top surface of one edge of the insertion rack is fixedly connected with the limiting blocks; the side walls of two sliding blocks are respectively rotatably connected with ends of the two hinge rods; the other ends of the two hinge rods are hinged with two ends of the hinge block; the bottom surface of the hinge block is fixedly connected with the output shaft of a clamping cylinder; the clamping cylinder is fixedly connected with the mounting plate.

Preferably, the transfer mechanical gripper includes a suspension groove which is in sliding fit with the connecting rail, the suspension groove is fixedly connected with the slider, the bottom surface of the suspension groove is fixedly connected with a connecting piece, the two sides of the connecting piece are slidably connected with a slide rail, the bottom end of the slide rail is fixedly connected with a connecting frame, a cylinder is fixedly connected between the connecting frame and the connecting piece, the side surface of the connecting frame is fixedly connected with a connecting bottom plate, and the side surface of the connecting bottom plate is provided with a slide rail groove; ends of two grippers are slidably connected in the slide rail groove, and the ends of opposite side of the two grippers are hinged with a connecting rod mechanism; a contraction cylinder is fixedly connected in the slide rail groove, and the piston end of the contraction cylinder is fixedly connected with one of the grippers.

The invention relates to a loading and conveying system of a tank track moving support, which includes a ground rail manipulator arranged at the discharge side (also referred to as unloading side) of a loading equipment, the loading equipment is the loading equipment described above, and the ground rail manipulator includes a rail assembly, a robot is connected to the rail assembly in a sliding way, and the end of a movable arm of the robot is fixedly connected with a mechanical gripper;

the mechanical gripper includes a fork fixedly connected to the end of the movable arm of the robot, two sides of the fork are fixedly connected with a mounting bracket, two ends of the mounting bracket far away from the fork are fixedly connected with clamping motors respectively, the output shaft of the clamping motor is connected with one end of a second connecting sheet, the other end of the second connecting sheet is hinged with one end of the first connecting sheet through a first hinge bracket, the other end of the first connecting sheet is hinged with a second hinge bracket, the second hinge bracket is fixedly connected with the clamping motor, the first hinge bracket is fixedly connected with a clamping piece, and the opposite side walls of two clamping pieces are fixedly connected with gaskets.

The invention has the following technical effects:

(1) The power-assisted device of the invention realizes the movement of the forklift insertion end in three directions of X, Y and Z through the cooperation of the X-axis and Y-axis guide rails and the power-assisted crane, and transports the tooling plates, the fixture body and the moving support, thereby reducing the movement intensity and improving the working efficiency.

(2) The circular conveyor line of the invention stably conveys the fixture assembly through the cooperation between the trays and the tooling plates, the motor adjusts the running duration and speed according to the working, and the tracking car is driven to move on the circular track through gears and chains, so that the fixture assembly can reach the grabbing position at an appropriate time.

(3) The ground rail manipulator of the invention drives the manipulator to adjust its position on the Y axis through the ground rail, thus completing more station handling; the mechanical gripper drives the clamping claw to clamp both sides by the motor to position the fixture assembly, and forks the fixture assembly by inserting the fork at the bottom of the tooling plates; grabbing and carrying are realized by six-axis manipulator. The ground rail manipulator has completed the handling of the follow fixture and moving support in the whole machining process.

(4) The screwing manipulator of the invention cooperates with the tooling manipulator to realize the installation of the tooling plates, the fixture and the moving support, and the fixture assembly is transported to the circular conveyor line by the gantry manipulator, and then transported by the ground rail manipulator to complete the automatic loading.

(5) The conveying manipulator of the gantry manipulator of the invention is positioned by positioning rivet, and the follow fixture is supported by the grippers at the bottom of both sides, so as to avoid the interference of the objects on the baseplate of the tooling plates and influence the grasping.

BRIEF DESCRIPTION OF THE DRAWINGS

In order to more clearly explain the embodiments of the invention or the technical schemes in the prior art, the drawings needed in the embodiments will be briefly introduced below. Apparently, the drawings in the following description are only some embodiments of the invention, and for ordinary technicians in the field, other drawings can be obtained according to these drawings without making creative efforts.

In drawings, 1: power-assisted device; 101: power-assisted bracket; 102: first beam; 103: second beam; 104: X-axis guide rail; 105: first connecting piece; 106: second connecting piece; 107: Y-axis guide rail; 108: power-assisted crane; 109: vertical sliding column; 110: forklift; 2: circular conveyor line; 201: support frame; 202: baseplate; 203: chain; 204: tray; 2041: tracking car; 2042: blind rivet positioning groove; 205: circular guide rail; 206: gear; 207: shaft; 208: mounting bracket; 209: gear motor; 3: ground rail manipulator; 301: track assembly; 302: robot; 303: mechanical gripper; 3031: mounting bracket; 3032, fork; 3033: clamping motor; 3034: first connecting sheet; 3035: second connecting sheet; 3036: gasket; 3037: clamping piece; 3038: first hinge bracket; 3039: second hinge bracket; 4. fixture assembly; 401: fixture body; 402: tooling plate; 403: blind rivet; 5: moving support; 6. automatic loading device; 601: mechanical arm; 602: inner hexagon screwing device; 603: outer hexagon screwing device; 604: rail; 605: storage workbench; 607: industrial camera; 608, external mechanical gripper; 609: screw slide assembly; 610: material taking bracket; 611: feeding device; 6111: mounting plate; 6112: guide rail mounting plate; 6113: lifting motor; 6114: clamping cylinder; 6115: hinge block; 6116: hinge rod; 6117: sliding block; 6118: insertion rack; 6119: limiting block; 61110: gear set; 612: internal mechanical gripper; 613: loading bracket; 614: connecting rail; 615: transfer bracket; 616: ball screw; 617: ball screw guide rail; 618: connecting block; 619. slider; 620: ball screw motor; 621: transfer mechanical gripper; 6211: suspension groove; 6212: connecting piece; 6213: cylinder; 6214: slide rail; 6215: connecting frame; 6216: positioning rivet; 6217: gripper; 6218: connecting bottom plate; 6219: slide rail groove; 62110: connecting rod mechanism; 7: intermediate connecting rod; 8: end connecting rod.

DETAILED DESCRIPTION OF THE EMBODIMENTS

Next, the technical schemes in the embodiments of the invention will be clearly and completely described with reference to the drawings in the embodiments of the invention. Obviously, the described embodiments are only part of the embodiments of the invention, not all of them. Based on the embodiments in the invention, all other embodiments obtained by ordinary technicians in the field without creative work are within the scope of the invention.

In order to make the above-mentioned objects, features and advantages of the invention more obvious and easier to understand, the invention will be described in further detail below with reference to the drawings and detailed description.

First Embodiment

Figure 1:
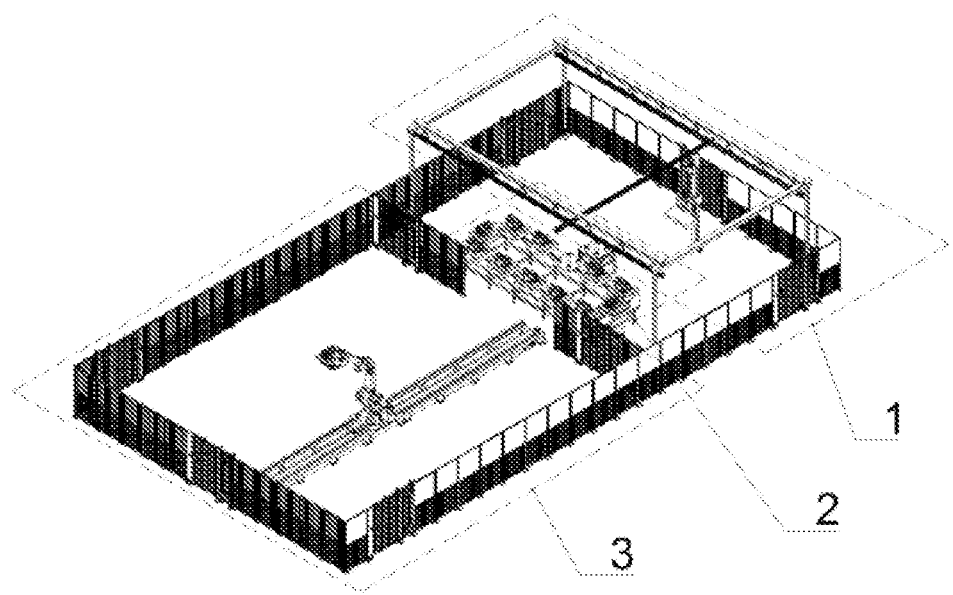
FIG. 1 is a layout diagram of a loading and conveying system according to the first embodiment of the invention.
Figure 2:
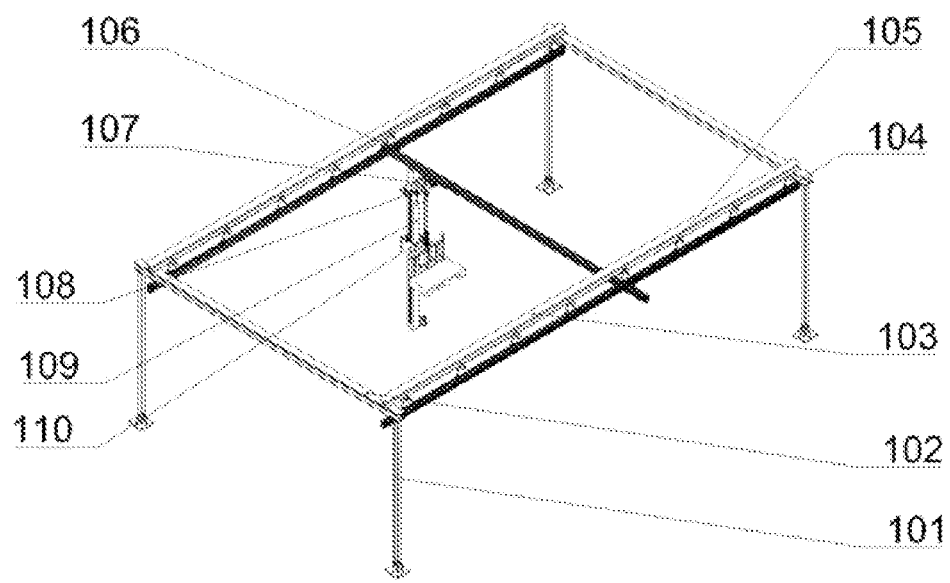
FIG. 2 is an isometric view of a power-assisted device according to the first embodiment of the invention.
Figure 3:
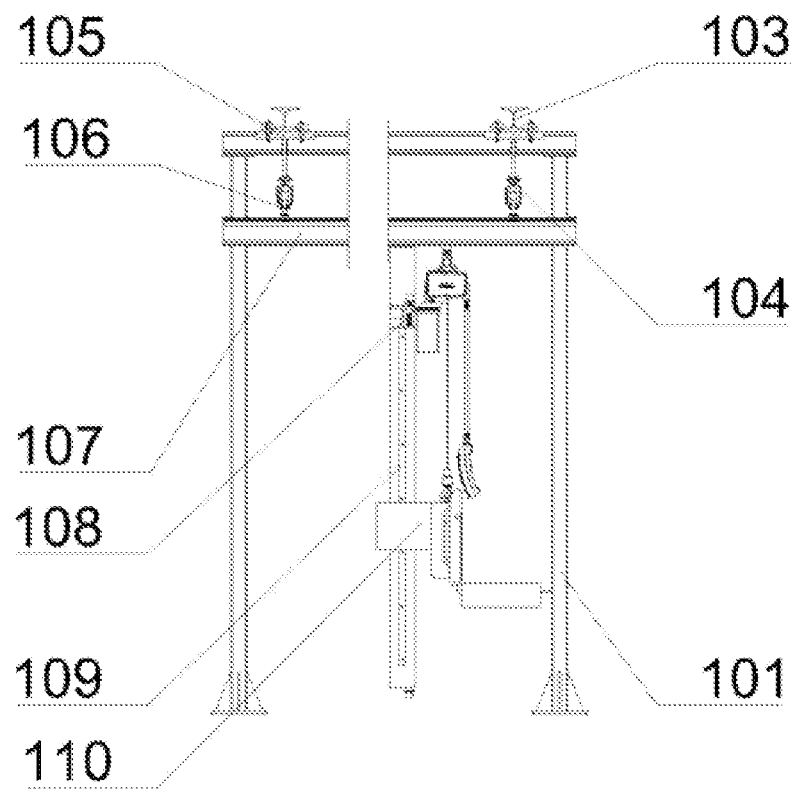
FIG. 3 is a sectional view of a power-assisted device according to the first embodiment of the invention.
Figure 4:
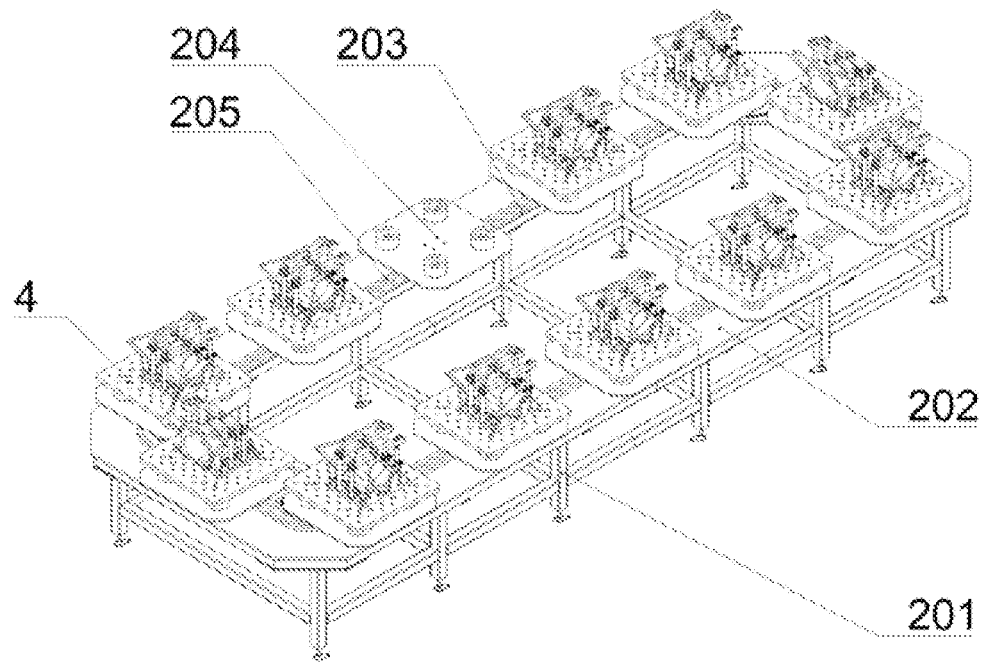
FIG. 4 is an isometric view of a circular conveyor line according to the first embodiment of the invention.
Figure 5:
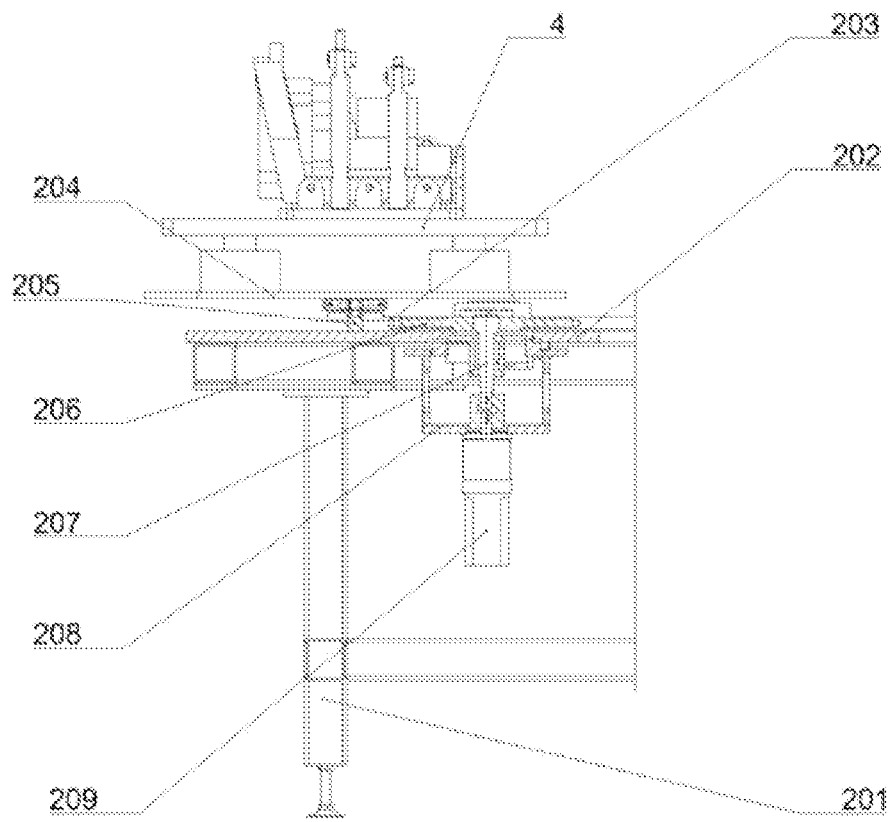
FIG. 5 is a sectional view of a circular conveyor line according to the first embodiment of the invention.
Figure 6:
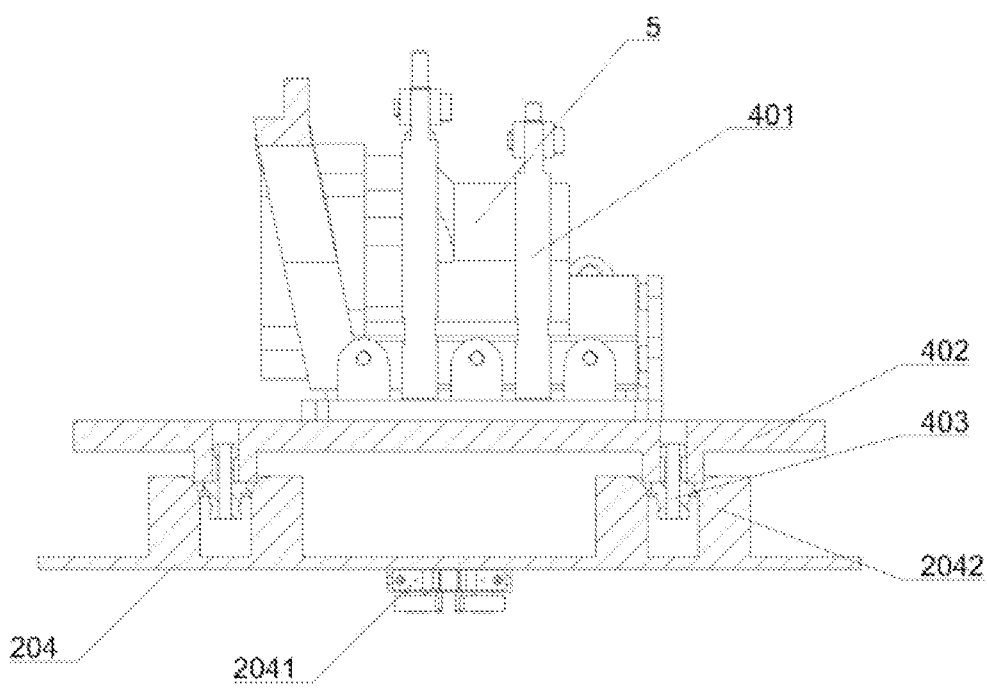
FIG. 6 is a fixture assembly fixing diagram of the first embodiment of the invention.
Figure 7:
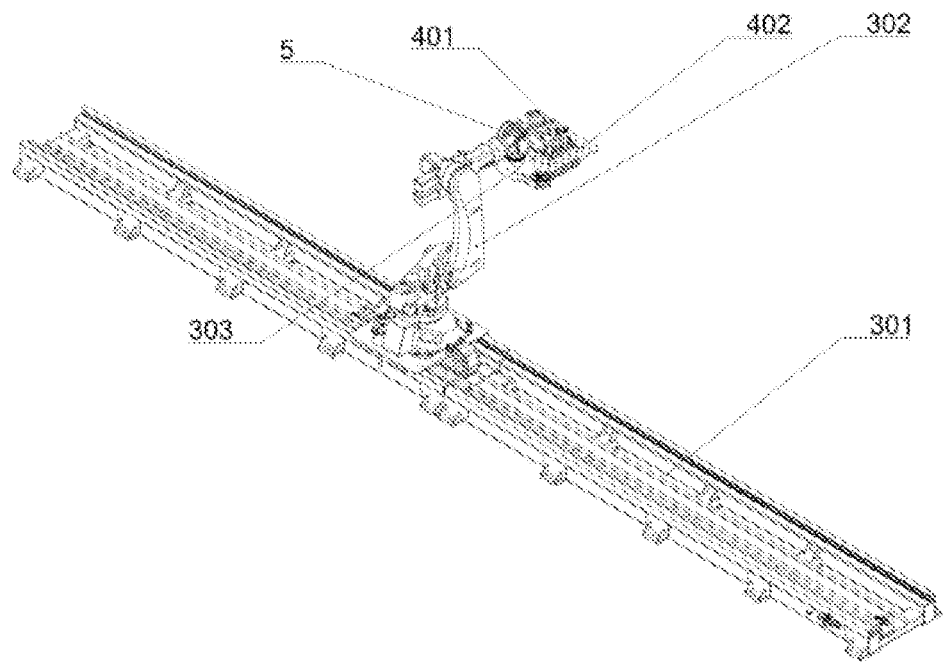
FIG. 7 is an isometric view of a ground rail manipulator according to the first embodiment of the invention.
Figure 8:
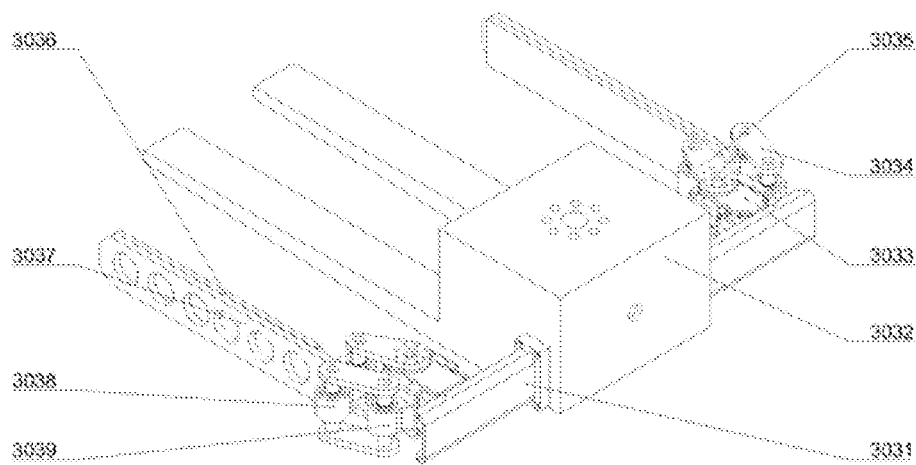
FIG. 8 is an isometric view of a mechanical gripper according to the first embodiment of the invention.
Figure 9:
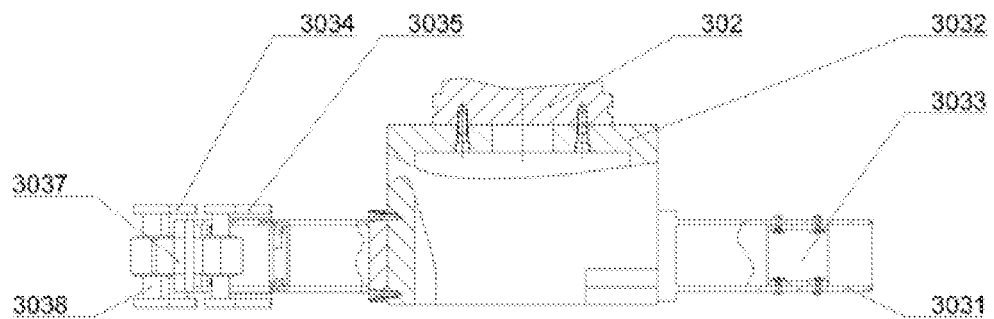
FIG. 9 is a partial sectional view of the mechanical gripper according to the first embodiment of the invention.

As shown in FIG. 1-FIG. 9, the automatic loading equipment for a tank track moving support of the embodiment includes the circular conveyor line 2, one side of the circular conveyor line 2 is provided with the loading device;

the circular conveyor line 2 includes the support frame 201, the top of the support frame 201 is fixedly connected with the baseplate 202, the top surface of the baseplate 202 is fixedly connected with the circular guide rail 205, a plurality of trays 204 are slidably connected above the circular guide rail 205, the top of the tray 204 is detachably connected with the fixture assembly 4, and the bottoms of the trays 204 are fixedly connected with the circular driving part for moving the trays 204;

the bottoms of the trays 204 are fixedly connected with tracking cars 2401 respectively, the tracking cars 2401 are slidably connected with the circular guide rail 205, and the circular driving part is fixedly connected with the tracking cars 2401.

According to the invention, the fixture assembly 4 is transported to the circular conveyor line 2 through the loading device, and the fixture assembly 4 is used for clamping the moving support 5, and then the loading is completed through the circular conveyor line 2, and the fixture assembly 4 and the trays 204 are arranged in a detachable manner, so that the fixture assembly 4 can be conveniently removed from the circular conveyor line 2 for the next operation.

In a further optimization scheme, the circular driving part includes gears 206 rotatably connected to the four corners of the baseplate 202, and the chain 203 is sleeved outside the four gears 206, and the chain 203 is fixedly connected with each of the tracking cars 2401, one of the gears 206 is coupled with the shaft 207, and the shaft 207 is coupled with the gear motor 209; the bottom surface of the baseplate 202 is fixedly connected with the mounting bracket 208; the gear motor 209 is fixedly connected with the mounting bracket 208; the top of the tray 204 is fixedly connected with the bland rivet positioning grooves 2042; and the fixture assembly 4 is detachably connected with the bland rivet positioning grooves 2042.

By controlling the operation of the gear motor 209, the gear motor 209 drives the gears 206 to rotate, the gears 206 drive the chain 203 to have circular displacement, the chain 203 drive the tracking cars 2041 to move, and the tracking cars 2041 drive the trays 204 to move along the circular guide rail 205, thus realizing the transportation of the moving support 5.

In a further optimization scheme, the fixture assembly 4 includes the tooling plate 402, the top of the tooling plate 402 is detachably connected with the fixture body 401; the bottom of the tooling plate 402 is fixedly connected with the blind rivet mounting grooves; the blind rivet mounting groove is detachably connected with the blind rivet 403; and the blind rivet 403 is detachably connected with the blind rivet positioning groove 2402.

Accurate positioning of the tooling plate 402 is realized by setting the blind rivet positioning grooves 2042 to match with the blind rivets 403 at the bottom of the tooling plate 402.

In a further optimization scheme, the loading device includes the power-assisted device 1 located at one side of the support frame 201, which includes the power-assisted bracket 101, the top surface of the power-assisted bracket 101 is fixedly connected with two first beams 102 and two second beams 103, the two first beams 102 are perpendicular to the two second beams 103, the bottoms of the second beams 103 are fixedly connected with the first connecting pieces 105, the bottoms of the first connecting pieces 105 are fixedly connected with the X-axis guide rails 104, and the bottoms of the X-axis guide rails 104 are fixedly connected with the second connecting pieces 106; the bottoms of the second connecting pieces 106 are fixedly connected with the Y-axis guide rail 107, and the bottom of the Y-axis guide rail 107 is slidably connected with the power-assisted crane 108 and the vertical sliding column 109, the power-assisted crane 108 is fixedly connected to one side of the top of the vertical sliding column 109, and the vertical sliding column 109 is slidably connected with the forklift 110, and the top of the forklift 110 is fixedly connected with a steel wire rope of the power-assisted crane 108.

When in use, the forklift 110 lifts the tooling plates 402, the forklift 100 are driven by the power-assisted crane 108 to move in the Z direction, and the movement in two directions in the horizontal direction is realized by the cooperation of the X-axis guide rail 104 and the Y-axis guide rail 107, so that the tooling plate 402 can communicate with the fixture assembly 4 to move in the X, Y and Z directions, which makes it more labor-saving for workers to put the fixture assembly 4 on the tray 204.

The automatic loading and conveying system of the tank track moving support includes the ground rail manipulator 3 arranged at the discharge side of the automatic loading equipment, the automatic loading equipment is the automatic loading equipment described above, and the ground rail manipulator 3 includes the rail assembly 301, the robot 302 is connected to the rail assembly 301 in a sliding way, and the end of a movable arm of the robot 302 is fixedly connected with the mechanical gripper 303;

the mechanical gripper 303 includes a fork 3032 fixedly connected to the end of the movable arm of the robot 302, two sides of the fork 3032 are fixedly connected with the mounting bracket 3031, two ends of the mounting bracket 3031 far away from the fork 3032 are fixedly connected with the clamping motors 3033 respectively, the output shaft of the clamping motor 3033 is connected with one end of the second connecting sheet 3035, the other end of the second connecting sheet 3035 is hinged with one end of the first connecting sheet 3034 through the first hinge bracket 3038, the other end of the first connecting sheet 3034 is hinged with the second hinge bracket 3039, the second hinge bracket 3039 is fixedly connected with the clamping motor 3033, the first hinge bracket 3038 is fixedly connected with clamping piece 3037, and the opposite side walls of two clamping pieces 3037 are fixedly connected with gaskets 3036.

By controlling the rotation of the clamping motors 3033, the clamping motors 3033 drives the four-rod mechanism formed by the first connecting sheet 3034 and the second connecting sheet 3035 to operate, thus driving the clamping pieces 3037 to clamp the tooling plates 402, and then controlling the operation of the ground rail manipulator 3, so that the tooling plates 402 together with the moving support 5 can be removed from the tray 204 and transported to the area to be processed.

Second Embodiment

Figure 10:
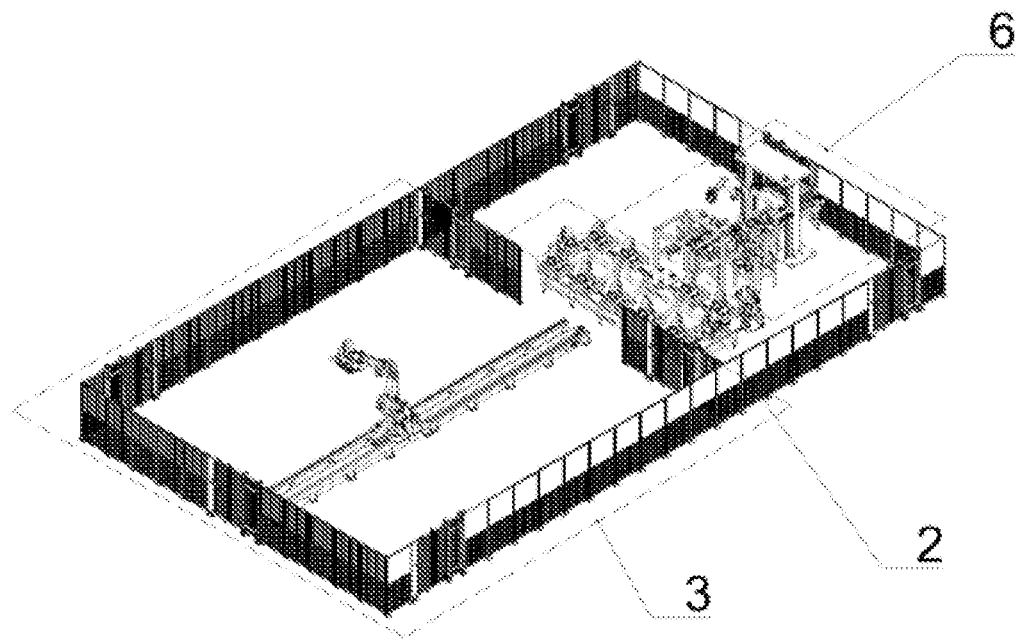
FIG. 10 is a layout diagram of the loading and conveying system according to the second embodiment of the invention.
Figure 11:
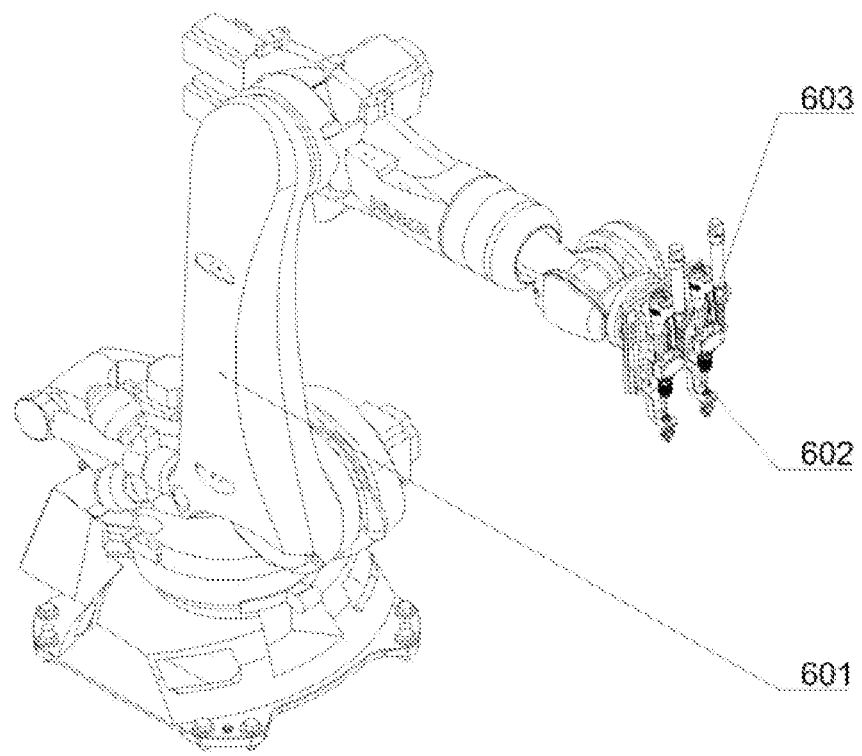
FIG. 11 is an isometric view of a mechanical arm according to the second embodiment of the invention.
Figure 12:
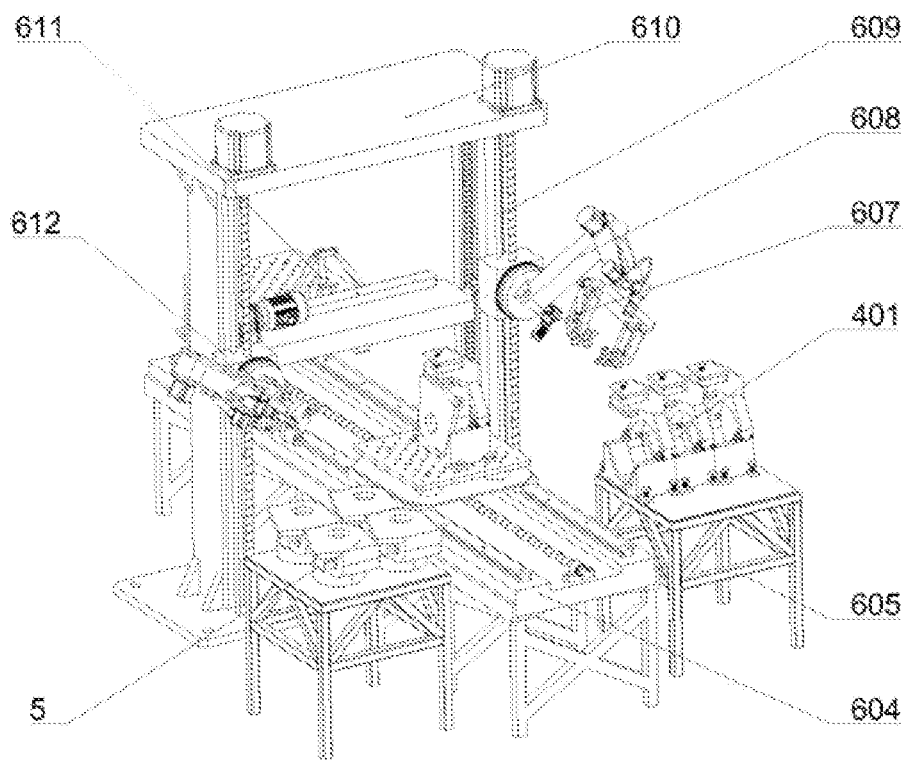
FIG. 12 is an isometric view of a fixture assembly mechanism according to the second embodiment of the invention.
Figure 13:
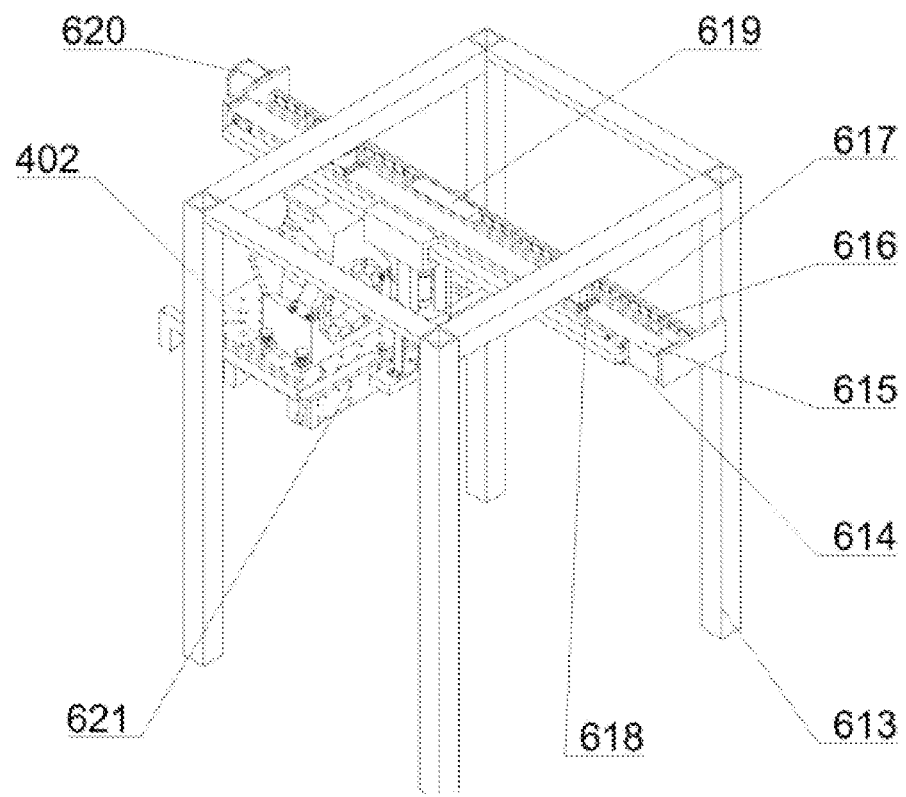
FIG. 13 is an isometric view of a handling mechanism according to the second embodiment of the invention.
Figure 14:
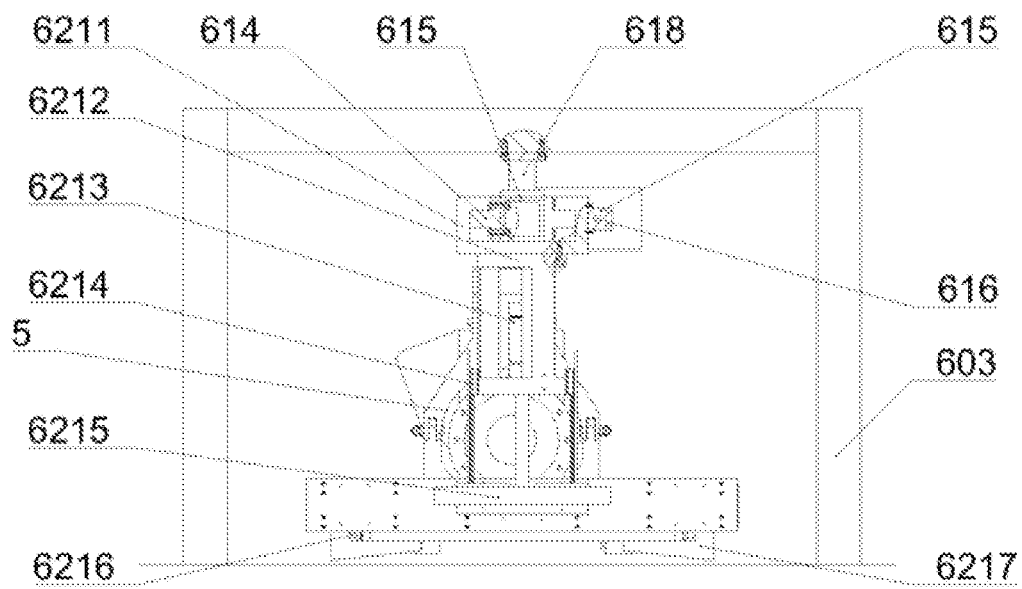
FIG. 14 is a partial sectional view of a transfer mechanical gripper according to the second embodiment of the invention.
Figure 15:
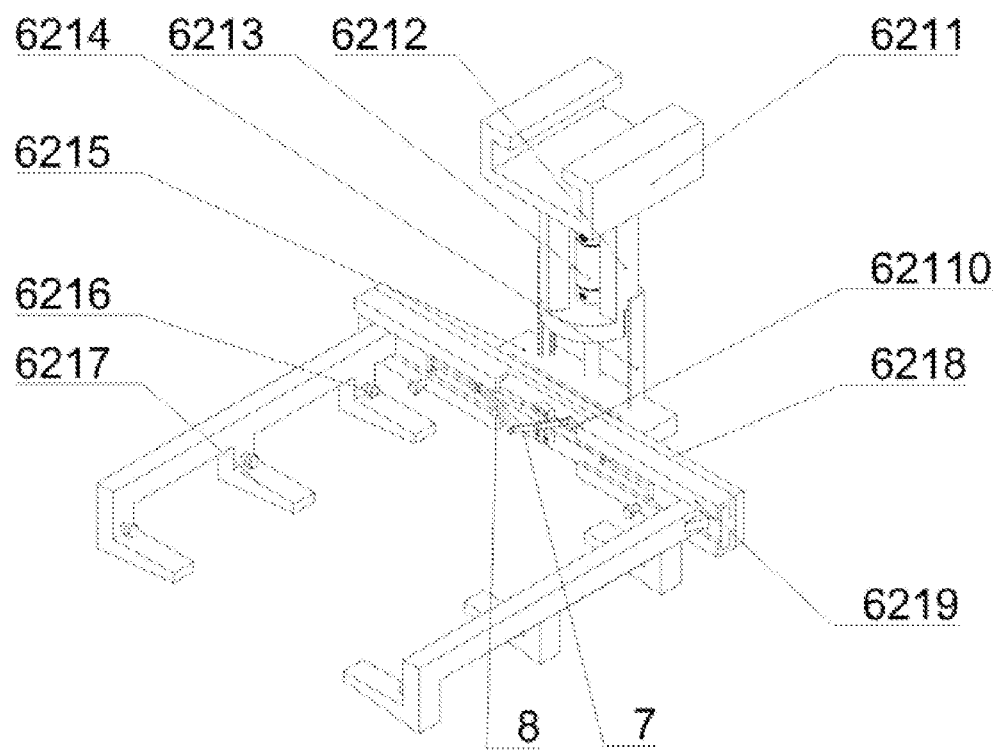
FIG. 15 is an axonometric view of the transfer mechanical gripper of the second embodiment of the invention.
Figure 16:
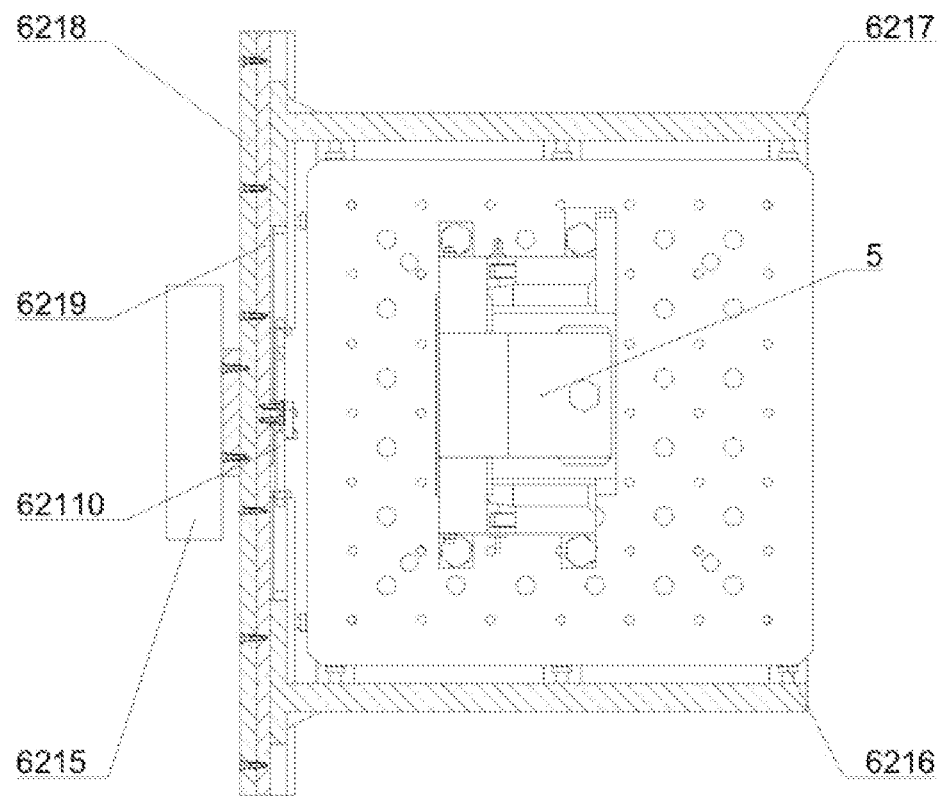
FIG. 16 is a schematic plan view of the transfer mechanical gripper of the second embodiment of the invention.
Figure 17:
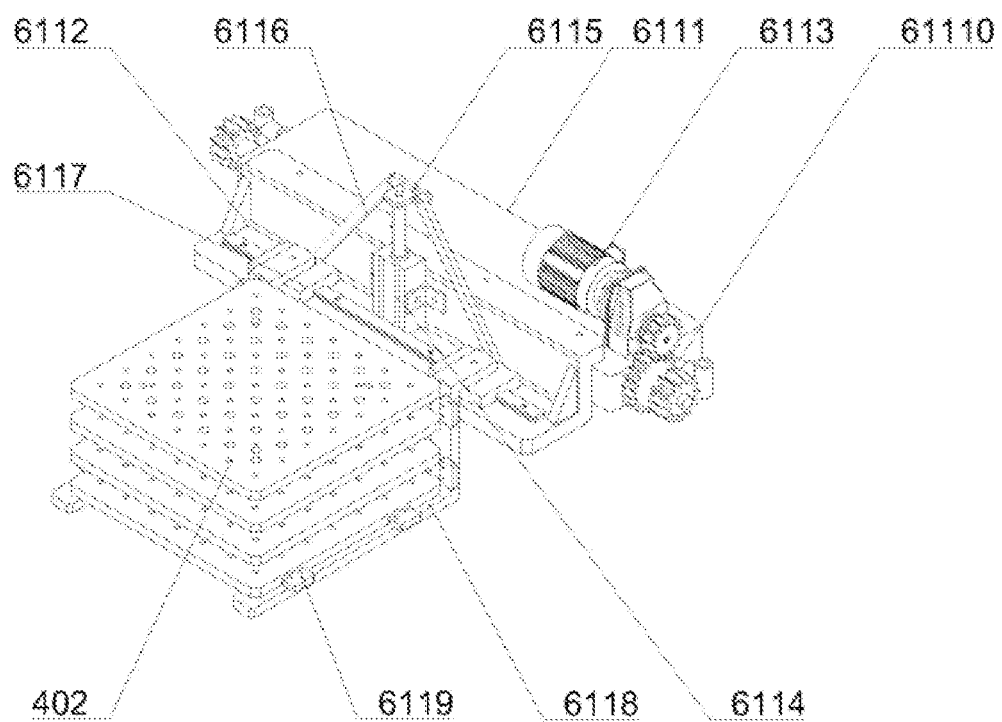
FIG. 17 is an isometric view of a feeding device according to the second embodiment of the invention.

Referring to FIG. 10-FIG. 16, the automatic loading equipment of the moving support of this embodiment differs from the first embodiment only in that the loading device includes the automatic loading device 6 located at one side of the support frame 201, and the automatic loading device 6 includes the handling mechanism, the side of the handling mechanism far away from the support frame 201 is provided with the screw mounting mechanism, and the side of the screw mounting mechanism far away from the support frame 201 is provided with the fixture assembling mechanism;

the screw mounting mechanism includes the mechanical arm 601, and the movable end of the mechanical arm 601 is fixedly connected with the inner hexagon screwing device 602 and the outer hexagon screwing device 603.

The fixture assembly 4 clamps the moving bracket 5 with by the fixture assembling mechanism, then the fixture body 401 is fixed on the tooling plate 402 by the screw mounting mechanism, and then the assembled fixture assembly 4 is put on the tray 204 by the handling mechanism.

In a further optimization scheme, the fixture assembling mechanism includes the rail 604, the rail 604 is slidably connected with the tray 204, the rail 604 is rotatably connected with the screw assembly, the slider of the screw assembly is fixedly connected with the bottom surface of the tray 204, the material taking bracket 610 is arranged across the rail 604, two upright columns of the material taking bracket 610 are respectively provided with screw slide assemblies 609, and the lead screw of one of the screw slide assemblies 609 is threadedly connected with the external mechanical gripper 608; the lead screw of the other screw slide assembly 609 is threadedly connected with the internal mechanical gripper 612, one end on both sides of the rail 604 is provided with the storage workbenches 605, the feeding device 611 is connected between the two upright columns of the material taking bracket 610 through a rack and pinion mechanism, the external mechanical gripper 608, the internal mechanical gripper 612, the storage workbenches 605 are located at the same side, the storage workbenches 605 are located at one side close to the support frame 201, and the industrial camera 607 is fixedly connected below any one of the external mechanical gripper 608 and the internal mechanical gripper 612.

By controlling the operation of the screw assembly, the trays 204 are transported to the internal mechanical gripper 612, and then the internal mechanical gripper 612 and the external mechanical gripper 608 are controlled to operate, and the fixture body 401 on the storage workbench 605 is put on the tooling plate 402, and the moving bracket 5 on the storage workbench 605 is put into the fixture body 401, and then the fixture body 401 is fixed on the tooling plate 402 by the inner hexagon screwing device 602 and the outer hexagon screwing device 603 on the mechanical arm 601 and the tooling plate 402 is transported to the tray 204 with the help of the handling mechanism.

In a further optimization scheme, the handling mechanism includes the loading bracket 613, the top of the loading bracket 613 is fixedly connected with the connecting block 618, the lower end of the connecting block 618 is fixedly connected with the transfer bracket 615, and both ends inside the transfer bracket 615 are rotatably connected with a ball screw 616, and both ends of the transfer bracket 615 are fixedly connected with a ball screw guide rail 617, the ball screw guide 617 is slidably connected with a slider 619, the slider 619 is screwed with the ball screw 616, and the ball screw 616 is connected with ball screw motor 620, and both sides of the transfer bracket 615 are fixedly connected with the connecting rail 614, the connecting rail 614 is fixedly connected with the transfer mechanical gripper 621 and the bottom of the slider 619 is fixedly connected with the transfer mechanical gripper 621.

By controlling the rotation of the ball screw motor 620, the ball screw motor 620 drives the transfer mechanical gripper 621 to move, and the transfer mechanical gripper 621 transports the tooling plates 402 to the trays 204.

In a further optimization scheme, the feeding device 611 includes the mounting plate 6111, two ends of the mounting plate 6111 are rotatably connected with the gear set 61110, the gear set 61110 is connected with the output shaft of the lifting motor 6113, the lifting motor 6113 is fixedly connected to the mounting plate 6111, one side of the mounting plate 6111 is fixedly connected with the guide rail mounting plate 6112, the guide rail mounting plate 6112 is fixedly connected with the convex rail, and the convex rail is slidably connected with two sliding blocks 6117, and the two sliding blocks 6117 are respectively fixedly connected with the insertion racks 6118, and the insertion rack 6118 is in an L-shaped structure; the top surface of one edge of the insertion rack 6118 is fixedly connected with the limiting blocks 6119; the side walls of two sliding blocks 6117 are respectively rotatably connected with ends of two hinge rods 6116; the other ends of two hinge rods 6116 are hinged with two ends of the hinge block 6115; the bottom surface of the hinge block 6115 is fixedly connected with the output shaft of the clamping cylinder 6114; the clamping cylinder 6114 is fixedly connected with the mounting plate 6111.

The plurality of stacked tooling plates 402 are placed between the two insertion racks 6118. By controlling the operation of the lifting motor 6113, the lifting motor 6113 drives the mounting plate 6111 to run up and down. When the lifting motor 6113 runs to the bottommost point, the clamping cylinder 6114 stretches to push the two insertion racks 6118 away, and the tooling plate 402 located at the bottommost are placed on the tray 204, and then the lifting motor 6113 is controlled to run so that the mounting plate 6111 is moved upward by the height of the tooling plate 402. At this time, the clamping cylinder 6114 is controlled to contract, and the two insertion racks 6118 are close to each other to hold the tooling plate 402, and then the lifting motor 6113 continues to move upward.

In a further optimization scheme, the transfer mechanical gripper 621 includes the suspension groove 6211 which is in sliding fit with the connecting rail 614, the suspension groove 621 is fixedly connected with the slider 619, the bottom surface of the suspension groove 621 is fixedly connected with the connecting piece 6212, the two sides of the connecting piece 6212 are slidably connected with the slide rail 6214, the bottom end of the slide rail 6214 is fixedly connected with the connecting frame 6215, the cylinder 6213 is fixedly connected between the connecting frame 6215 and the connecting piece 6212, the side surface of the connecting frame 6215 is fixedly connected with the connecting bottom plate 6218, and the side surface of the connecting bottom plate 6218 is provided with the slide rail groove 6219; ends of two grippers 6217 are slidably connected in the slide rail groove 6219, and ends of the opposite side of the two grippers 6217 are hinged with the connecting rod mechanism 62110; the contraction cylinder is fixedly connected in the slide rail groove 6219, and the piston end of the contraction cylinder is fixedly connected with one of the grippers 6217.

The connecting rod mechanism 62110 includes the intermediate connecting rod 7 whose middle part is rotatably connected with the slide rail groove 6219. Both ends of the intermediate connecting rod 7 are respectively hinged with ends of the end connecting rods 8, and the other ends of the two end connecting rods 8 are respectively hinged with the ends of the opposite side of the two grippers 6217.

By controlling the expansion or contraction of the cylinder 6213, the connecting frame 6215 is driven to move up and down, so that the whole transfer mechanical gripper 621 move in Z direction. By controlling the expansion or contraction of the cylinder, one of the grippers 6217 displaces, so that one end connecting rod 8 drive one end of the intermediate connecting rod 7 to rotate, the other end of the intermediate connecting rod 7 drives the other end connecting rod 8 to move, and the other end connecting rod 8 drives the other gripper 6217 to move, thus realizing that the two grippers 6217 are far away from each other or close to each other, so as to clamp or release the tooling plates 402.

In the description of the invention, it should be understood that the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, and are only for the convenience of describing the invention, rather than indicating or implying that the device or element referred to must have a specific orientation, be configured and operated in a specific orientation, and therefore cannot be understood as a limitation of the invention.

The above-mentioned embodiments only describe the preferred mode of the invention, and do not limit the scope of the invention. Without departing from the design spirit of the invention, all kinds of modifications and improvements made by ordinary technicians in the field to the technical scheme of the invention should fall within the protection scope determined by the claims of the invention.

What is claimed is:

1. A loading equipment for a tank track moving support, comprising:
    a circular conveyor line (2); and
    a loading device, disposed on one side of the circular conveyor line (2);
    wherein the circular conveyor line (2) comprises:
        a support frame (201);
        a baseplate (202), fixedly connected to a top of the support frame (201);
        a circular guide rail (205), fixedly connected to a top surface of the baseplate (202);
        a plurality of trays (204), slidably connected above the circular guide rail (205);
        fixture assemblies (4), detachably connected to tops of the plurality of trays (204) respectively; and
        a circular driving part, fixedly connected to bottoms of the plurality of trays (204) and configured for moving the plurality of trays (204) respectively;
    wherein the bottoms of the plurality of trays (204) are fixedly connected with a plurality of tracking cars (2041) respectively, the plurality of tracking cars (2041) are slidably connected with the circular guide rail (205), and the circular driving part is fixedly connected with the plurality of tracking cars (2041);
    wherein the circular driving part comprises four gears (206) rotatably connected to four corners of the baseplate (202) respectively, and a chain (203) is sleeved outside the four gears (206), and the chain (203) is fixedly connected with the plurality of tracking cars (2041);
    wherein one of the four gears (206) is coupled with a shaft (207), and the shaft (207) is coupled with a gear motor (209), a mounting bracket (208) is fixedly connected to a bottom surface of the baseplate (202), the gear motor (209) is fixedly connected with the mounting bracket (208), the top of each of the plurality of trays (204) is fixedly connected with bland rivet positioning grooves (2042), and a corresponding one of the fixture assemblies (4) is detachably connected to the bland rivet positioning grooves (2042).

2. The loading equipment according to claim 1, wherein each of the fixture assemblies (4) comprises:
    a tooling plate (402);
    a fixture body (401), detachably connected to a top of the tooling plate (402);
    wherein a bottom of the tooling plate (402) is fixedly connected with blind rivet mounting grooves, the blind rivet mounting grooves are detachably connected with blind rivets (403) respectively, and the blind rivets (403) are detachably connected with the blind rivet positioning grooves (2042) respectively.

3. The loading equipment according to claim 2, wherein the loading device comprises an automatic loading device (6) located at one side of the support frame (201), and the automatic loading device (6) comprises:
   a handling mechanism;
   a screw mounting mechanism, disposed on a side of the handling mechanism facing away from the support frame (201); and
   a fixture assembling mechanism, disposed on a side of the screw mounting mechanism facing away from the support frame (201);
   wherein the screw mounting mechanism comprises a mechanical arm (601), and a movable end of the mechanical arm (601) is fixedly connected with an inner hexagon screwing device (602) and an outer hexagon screwing device (603).

4. The loading equipment according to claim 3, wherein the fixture assembling mechanism comprises a rail (604), the rail (604) is slidably connected with one of the plurality of trays (204), the rail (604) is rotatably connected with a screw assembly, a slider of the screw assembly is fixedly connected with a bottom surface of the one of the plurality of trays (204), a material taking bracket (610) is arranged across the rail (604), two upright columns of the material taking bracket (610) are respectively provided with screw slide assemblies (609), and a lead screw of one of the screw slide assemblies (609) is threadedly connected with an external mechanical gripper (608); a lead screw of the other of the screw slide assemblies (609) is threadedly connected with an internal mechanical gripper (612), ends on both two sides of the rail (604) is provided with storage workbenches (605), a feeding device (611) is connected between the two upright columns of the material taking bracket (610) through a rack and pinion mechanism, the external mechanical gripper (608), the internal mechanical gripper (612) and the storage workbenches (605) are located at a same side, the storage workbenches (605) are located at a side close to the support frame (201), and an industrial camera (607) is fixedly connected below one of the external mechanical gripper (608) and the internal mechanical gripper (612).

5. The loading equipment according to claim 4, wherein the feeding device (611) comprises: a mounting plate (6111), two ends of the mounting plate (6111) are rotatably connected with a gear set (61110), the gear set (61110) is connected with an output shaft of a lifting motor (6113), the lifting motor (6113) is fixedly connected to the mounting plate (6111), one side of the mounting plate (6111) is fixedly connected with a guide rail mounting plate (6112), the guide rail mounting plate (6112) is fixedly connected with a convex rail, the convex rail is slidably connected with two sliding blocks (6117), the two sliding blocks (6117) are fixedly connected with insertion racks (6118) respectively, each of the insertion racks (6118) is in an L-shaped structure; a top surface of one edge of each of the insertion racks (6118) is fixedly connected with limiting blocks (6119); side walls of the two sliding blocks (6117) are respectively rotatably connected with ends of two hinge rods (6116); the other ends of the two hinge rods (6116) are hinged with two ends of a hinge block (6115); a bottom surface of the hinge block (6115) is fixedly connected with an output shaft of a clamping cylinder (6114); and the clamping cylinder (6114) is fixedly connected with the mounting plate (6111).

6. The loading equipment according to claim 3, wherein the handling mechanism comprises a loading bracket (613), a connecting block (618) is fixedly connected with a top of the loading bracket (613), a transfer bracket (615) is fixedly connected with a lower end of the connecting block (618), and a ball screw (616) is rotatably connected with both two ends inside the transfer bracket (615), and both two ends of the transfer bracket (615) are fixedly connected with a ball screw guide rail (617) slidably connected with a slider (619), the slider (619) is screwed with the ball screw (616), and the ball screw (616) is connected with a ball screw motor (620), and the both two sides of the transfer bracket (615) are fixedly connected with a connecting rail (614) fixedly connected with a transfer mechanical gripper (621) and a bottom of the slider (619) is fixedly connected with the transfer mechanical gripper (621).

7. The loading equipment according to claim 6, wherein the transfer mechanical gripper (621) comprises:
   a suspension groove (6211), slidably matched with the connecting rail (614) and fixedly connected with the slider (619);
   a connecting piece (6212), fixedly connected with a bottom surface of the suspension groove (6211);
   a slide rail (6214), slidably connected with two sides of the connecting piece (6212);
   a connecting frame (6215), fixedly connected with a bottom end of the slide rail (6214);
   a cylinder (6213), fixedly connected between the connecting frame (6215) and the connecting piece (6212);
   a connecting bottom plate (6218), fixedly connected with a side surface of the connecting frame (6215);
   a slide rail groove (6219), provided on a side surface of the connecting bottom plate (6218); and
   two grippers (6217), ends of the two grippers (6217) are slidably connected in the slide rail groove (6219), and ends of opposite sides of the two grippers (6217) are hinged with a connecting rod mechanism (62110), a contraction cylinder is fixedly connected in the slide rail groove (6219), and a piston end of the contraction cylinder is fixedly connected with one of the two grippers (6217).

8. The loading equipment according to claim 1, wherein the loading device comprises a power-assisted device (1) located at one side of the support frame (201), and the power-assisted device (1) comprises:
   a power-assisted bracket (101);
   two first beams (102) and two second beams (103), fixedly connected to a top surface of the power-assisted bracket (101), wherein the two first beams (102) are perpendicular to the two second beams (103);
   first connecting pieces (105), fixedly connected to a bottom of the two second beams (103);
   X-axis guide rails (104), fixedly connected to bottoms of the first connecting pieces (105);
   second connecting pieces (106), fixedly connected with bottoms of the X-axis guide rails (104);
   a Y-axis guide rail (107), fixedly connected with bottoms of the second connecting pieces (106);
   a power-assisted crane (108) and a vertical sliding column (109), slidably connected with a bottom of the Y-axis guide rail (107), wherein the power-assisted crane (108) is fixedly connected to a side of a top of the vertical sliding column (109); and
   a forklift (110), slidably connected to the vertical sliding column (109), wherein a top of the forklift (110) is fixedly connected with a steel wire rope of the power-assisted crane (108).

9. A loading and conveying system of a tank track moving support, comprising: the loading equipment according to claim 1, and a ground rail manipulator (3) arranged at a discharge side of the loading equipment;

wherein the ground rail manipulator (3) comprises a rail assembly (301), a robot (302) is connected to the rail assembly (301) in a sliding way, and a mechanical gripper (303) is fixedly connected with an end of a movable arm of the robot (302);

wherein the mechanical gripper (303) comprises:
- a fork (3032), fixedly connected to the end of the movable arm of the robot (302);
- a mounting bracket (3031), fixedly connected with two sides of the fork (3032);
- clamping motors (3033), fixedly connected with two ends of the mounting bracket (3031) far away from the fork (3032) respectively;
- second connecting sheets (3035), one end of each of the second connecting sheets (3035) is connected with an output shaft of each of the clamping motors (3033);
- first hinge brackets (3038);
- first connecting sheets (3034), one end of each of the first connecting sheets (3034) is hinged with another end of each of the second connecting sheets (3035) through correspond the two clamping pieces (3037) ding one of the first hinge brackets (3038);
- second hinge brackets (3039), each of the second hinge bracket (3039) is hinged with the other end of each of the first connecting sheets (3034), and each of the second hinge brackets (3039) is fixedly connected with corresponding one of the clamping motors (3033);
- clamping pieces (3037), each of the clamping pieces (3037) is fixedly connected with corresponding one of the first hinge brackets (3038); and
- gaskets (3036), fixedly connected with opposite side walls of the two clamping pieces (3037).

* * * * *